United States Patent [19]
van der Merwe

[11] Patent Number: 5,631,535
[45] Date of Patent: May 20, 1997

[54] REGULATOR FOR CHARGING A RECHARGEABLE STORAGE DEVICE FROM A PHOTOVOLTAIC CELL

[75] Inventor: Lyon van der Merwe, Pretoria North, South Africa

[73] Assignee: Franklin Electric Co., Inc., Bluffton, Ind.

[21] Appl. No.: 478,448

[22] Filed: Jun. 7, 1995

[51] Int. Cl.$^6$ .................................................. H02J 7/00
[52] U.S. Cl. ................................................ 320/9; 320/29
[58] Field of Search .................................... 320/9, 15, 12, 320/5, 14, 56, 29

[56] References Cited

U.S. PATENT DOCUMENTS

| | | | |
|---|---|---|---|
| 4,143,282 | 3/1979 | Berard, Jr. et al. | 307/43 |
| 4,209,346 | 6/1980 | King | 136/89 |
| 4,306,183 | 12/1981 | Wright | 320/39 |
| 4,375,662 | 3/1983 | Baker | 363/95 |
| 4,383,211 | 5/1983 | Staler | 320/9 |
| 4,401,935 | 8/1983 | Yerkes | 320/9 |
| 4,410,930 | 10/1983 | Yachabach | 362/145 |
| 4,422,031 | 12/1983 | Vigerstol | 320/2 |
| 4,441,143 | 4/1984 | Richardson, Jr. | 362/183 |
| 4,467,265 | 8/1984 | Hierholzer, Jr. | 320/17 |
| 4,468,569 | 8/1984 | Norris | 290/1 R |
| 4,614,879 | 9/1986 | Ault | 307/130 |
| 4,661,758 | 4/1987 | Whittaker | 320/21 |
| 4,808,904 | 2/1989 | Ricaud et al. | 320/2 |
| 4,847,546 | 7/1989 | Bobier et al. | 320/21 |
| 4,873,480 | 10/1989 | Lafferty | 323/229 |
| 5,153,497 | 10/1992 | Eiden | 320/61 |
| 5,197,801 | 3/1993 | Swisher | 366/167 |
| 5,264,777 | 11/1993 | Smead | 320/6 |

OTHER PUBLICATIONS

Solarex International Newsletter, Jun. 1982, vol. 5, No. 2, 8–page brochure.
Solarex/Semix Vertical Integration, Nov. 1981, 1 page.
Semix Incorporated "Silicon for Solar Electricity: Pioneering an Industry", 1981, 4–page brochure.
SX Series Solar Electric Panels, 2–page brochure, Solarex Corporation, 1982.
Cathodic Protection Through Solar Electricity, Solarex Corporation, 1984.
SX–10 Photovoltaic Module 2–page brochure, Solarex Corporation, 1985.
Solarex Corporation company brochure, 8 pages, undated.
Photovoltaic System Design Assistance Center Program Description, Sandia National Laboratories, Jul. 1986, 17 pages.
"Solar Photovoltaic Power Supplies", Sep. 1986, Solarex Corporation, 4 pages.
SX–42 Photovoltaic Module 2–page brochure, Solarex Corporation 1985.
Building Blocks for Solar Electricity, 1981 Edition, Solarex Corporation.

*Primary Examiner*—Peter S. Wong
*Assistant Examiner*—Patrick B. Law
*Attorney, Agent, or Firm*—Marshall, O'Toole, Gerstein, Murray & Borun

[57] ABSTRACT

A circuit regulates charging of a rechargeable storage device having a pair of device terminals by a photovoltaic cell having a pair of cell terminals. The circuit has a pair of input terminals for coupling to the cell terminals and a pair of output terminals for coupling to the device terminals. The circuit includes a switch for selectively establishing and breaking an electrical connection between the input terminals and the output terminals and a variable resistor coupled to the device terminals for providing a signal proportional to a terminal voltage across the output terminals. The circuit also includes first and second operational amplifiers responsive to the signal and respective first and second voltage limits, each operational amplifier causing the switch to establish an electrical connection between the input terminals and the output terminals when the signal is equal to a predetermined proportion of the respective voltage limit. The circuit may be coupled in a solar-powered charging system between a photovoltaic cell and a rechargeable storage device.

27 Claims, 4 Drawing Sheets

PRIORT ART

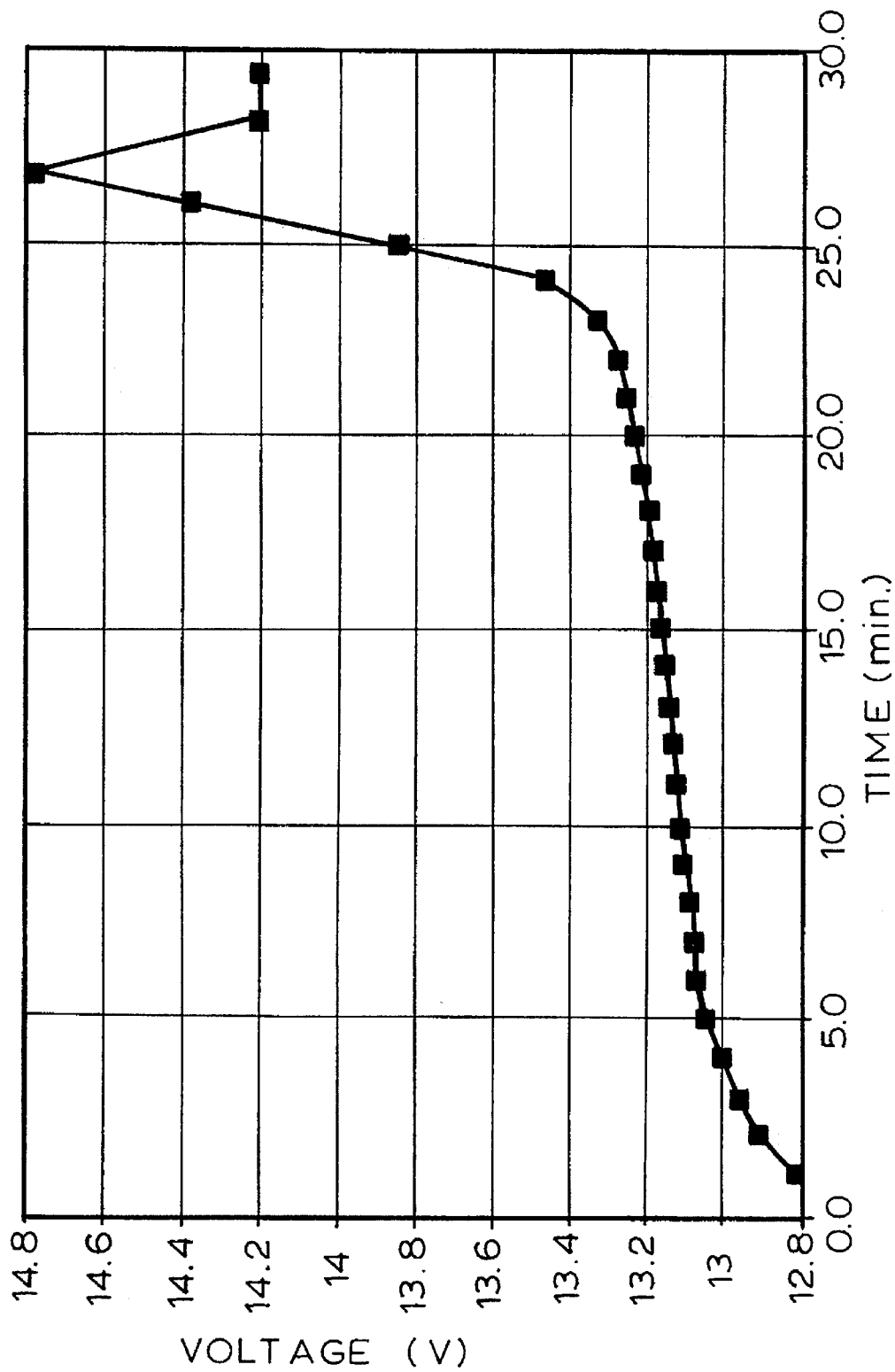

5,631,535

REGULATOR FOR CHARGING A RECHARGEABLE STORAGE DEVICE FROM A PHOTOVOLTAIC CELL

TECHNICAL FIELD

The present invention relates generally to regulator circuits and, more particularly, to a regulator circuit for regulating the charging of a rechargeable electrical storage device, such as a battery, from a photovoltaic cell.

BACKGROUND ART

Frequently, particularly in geographical areas where electric power is needed but not readily available, electric energy is generated by a photovoltaic cell array (i.e., a solar cell) and stored in a battery or other rechargeable electrical storage device. Specifically, the photovoltaic cell array generates an electric current that is electrically coupled to the battery. The current is converted into stored electrical energy in the battery, and the battery thus becomes charged. In some instances, the energy stored in the battery is converted by an inverter to a variable-frequency supply voltage which, in turn, drives a load such as an electric motor which may, for example, be connected to a pump.

To increase the efficiency of the charging process, a regulator is often coupled between the photovoltaic cell array and the battery to regulate the current delivered to the battery by the photovoltaic cell array. However, prior-art regulators either have failed to achieve a satisfactory level of charging efficiency, or have been too expensive to be practical for use in typical solar-powered battery-charging applications.

SUMMARY OF THE INVENTION

According to one aspect of the present invention, a circuit has input terminals for coupling to cell terminals of a solar cell and output terminals for coupling to device terminals of a rechargeable storage device. The circuit regulates charging of the rechargeable storage device by the photovoltaic cell. The circuit selectively establishes and breaks an electrical connection between the input terminals and the output terminals based on a comparison of a signal proportional to the voltage across the output terminals and a first voltage limit. The circuit also selectively establishes and breaks the electrical connection based on a comparison of the signal and a second voltage limit.

BRIEF DESCRIPTION OF THE DRAWINGS

The invention may be best understood by reference to the following description taken in conjunction with the accompanying drawings, in which like reference numerals identify like elements in the several figures and in which:

FIG. 5 is a waveform illustrating the first-time charging characteristic of a battery charged through the regulator of FIGS. 2 and 3.

DESCRIPTION OF THE PREFERRED EMBODIMENTS

Figure 1:
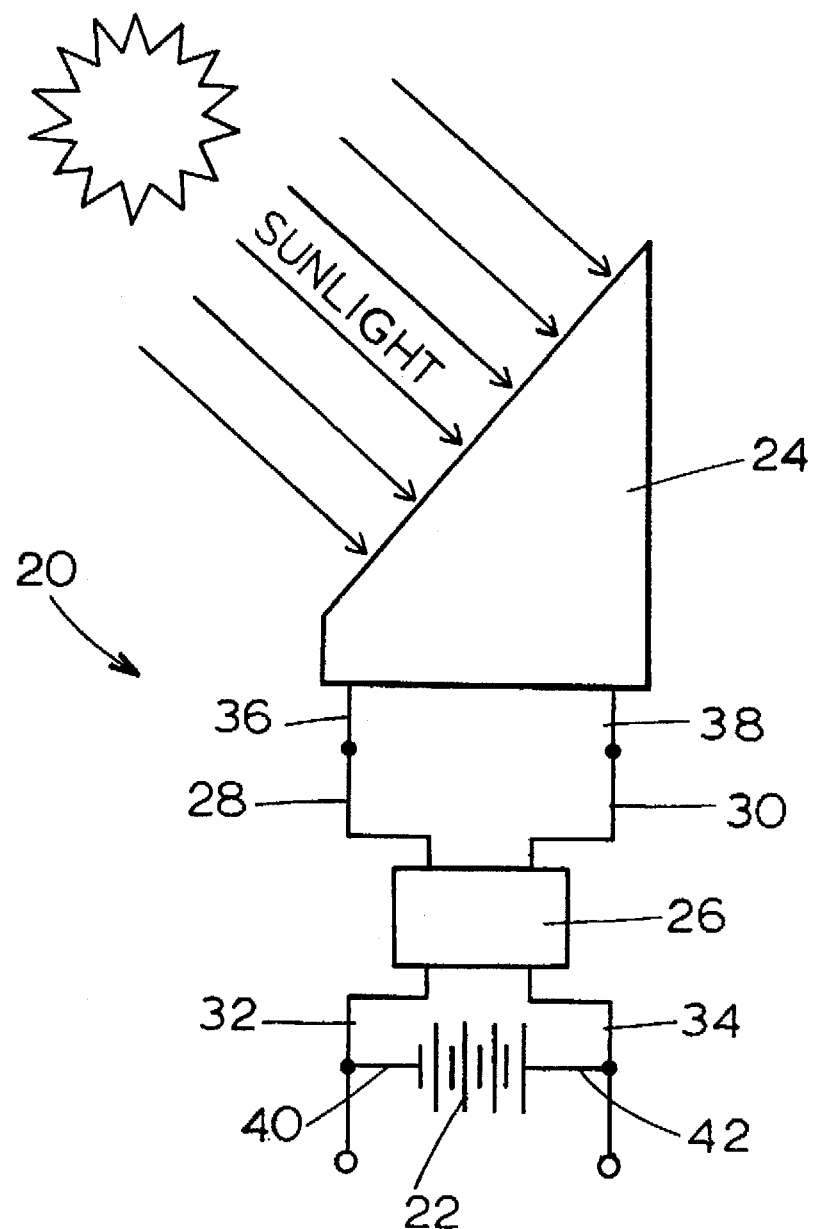
FIG. 1 is a block diagram of a prior-art system in which a regulator may be used for charging a battery from a photovoltaic cell.

FIG. 1 illustrates a system 20 for charging a rechargeable storage device or battery 22 from a photovoltaic cell or solar cell 24. The system 20 includes a regulator 26 coupled between the solar cell 24 and the battery 22. More particularly, the regulator 26 has a pair of input terminals 28, 30 and a pair of output terminals 32, 34. The solar cell 24 has a pair of cell terminals 36, 38, each of which is coupled to a respective one of the input terminals 28, 30 of the regulator 26. The battery 22 (or other suitable rechargeable storage device) has a pair of device terminals 40, 42, each of which is coupled to a respective one of the output terminals 32, 34 of the regulator 26.

As noted above, this system 20 for regulating the charging of a battery 22 from a solar cell 24 is known in the prior art. The present invention relates to a regulator that may be employed in the system 20 in place of the regulator 26 for regulating charging of the battery 22. For convenience, the regulator of the present invention is described below in relation to the solar-powered charging system 20 shown in FIG. 1.

Figure 2:
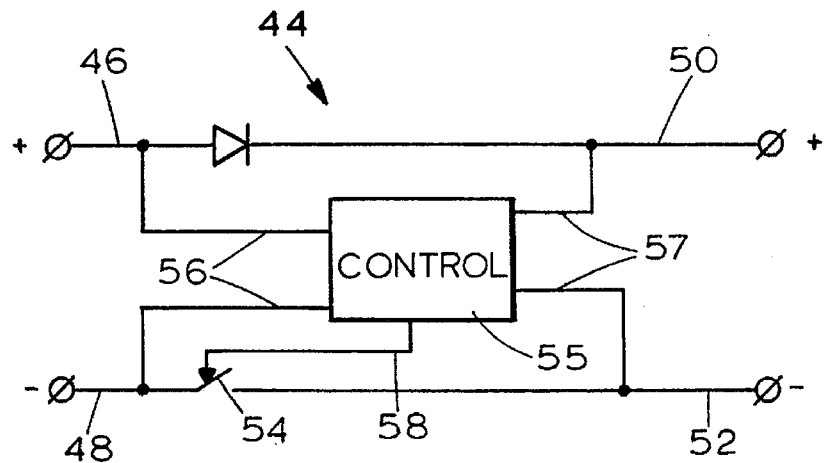
FIG. 2 is a generalized schematic diagram of a regulator according to the present invention.

FIG. 2 generally depicts a regulator 44 according to the present invention. The regulator 44 is a circuit for regulating charging of a rechargeable storage device, such as the battery 22 (shown in FIG. 1), by a photovoltaic cell, such as the solar cell 24 (also shown in FIG. 1). Like the regulator 26, the regulator 44 has a pair of input terminals 46, 48 for coupling to the cell terminals 36, 38 of the solar cell 24. The regulator 44 also has a pair of output terminals 50, 52 for coupling to the device terminals 42, 44 of the battery 22. Further, the regulator 44 includes a switch 54 or other switching means for selectively establishing and breaking an electrical connection between the input terminals 46, 48 and the output terminals 50, 52. Still further, a control 55 is coupled to the input terminals 46, 48 by lines 56 and to the output terminals 50, 52 by lines 57 of the regulator 44 as well as to the switch 54 thereof by a line 58.

The structure and operation of the regulator 44, and of the control 55 in particular, is described in detail hereinafter. Generally, the control 55 includes means connected to the lines 57 for providing a signal $V_T$ proportional to a voltage across the output terminals 50, 52 of the regulator 44. The control 55 also includes first means responsive to the signal $V_T$ and to a first voltage limit $V_1$ for causing the switch 54 to close. The closing of the switch 54 establishes an electrical connection between the input terminals 46, 48 and the output terminals 50, 52 of the regulator 44 when the signal $V_T$ is equal to a first predetermined proportion of the first voltage limit $V_1$. In addition, the control 55 includes second means responsive to the signal $V_T$ and to a second voltage limit $V_2$ for causing the switch 54 to close. Once again, the closing of the switch 54 establishes an electrical connection between the input terminals 46, 48 and the output terminals 50, 52 of the regulator 44 when the signal $V_T$ is equal to a second predetermined proportion of the second voltage limit $V_2$. Of course, if $V_T$ is equal to either of the first or second voltage limits, then the respective predetermined proportion will be one.

Figure 3:
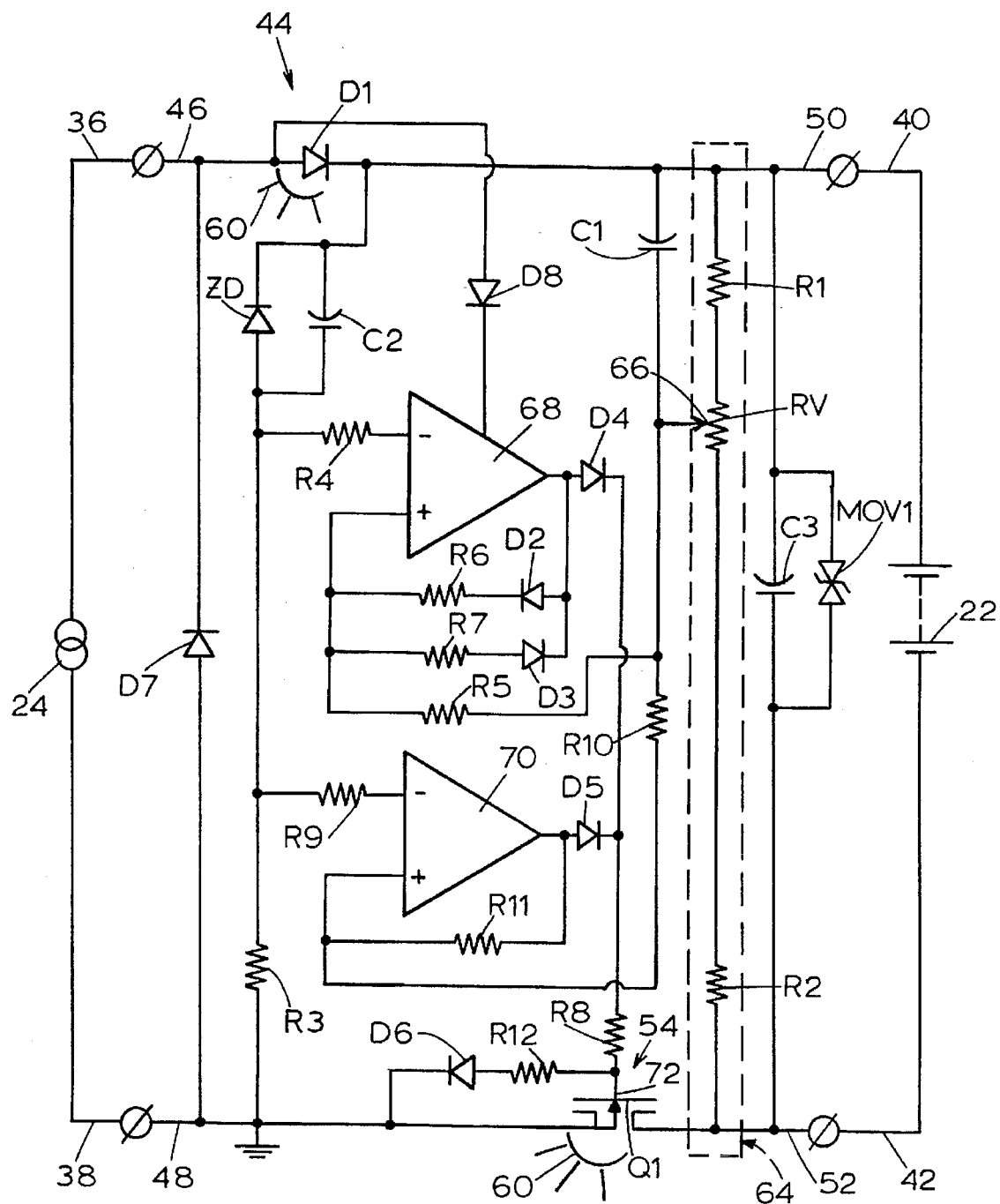
FIG. 3 is a detailed schematic diagram of the regulator of FIG. 2.

FIG. 3 is a schematic diagram illustrating the regulator 44 in greater detail. The following description provides exemplary values for circuit elements of a regulator 44 adapted for charging a lead-acid automobile battery having a rated voltage of about fourteen volts, which is commonly used in solar charging applications. It will be readily apparent to those skilled in the art, however, that a regulator designed in accordance with the present invention may employ circuit elements having different values for charging other types of batteries, if desired.

As shown, the switch 54 comprises a low-voltage field-effect transistor Q1 provided with a heat sink 60 for dissipating heat generated by the transistor Q1. Of course, any other suitable transistor or other switching means may be used instead of the Schottky transistor Q1. When the transistor Q1 is in the conducting or "on" state, it establishes an electrical connection between the input terminals 46, 48 and the output terminals 50, 52, and when the transistor Q1 is in the non-conducting or "off" state, it breaks that connection.

A Schottky high-power diode D1 is coupled between the input terminal 46 and the output terminal 50 of the regulator 44, the anode of the diode D1 being coupled to the input terminal 46, and the cathode of the diode D1 being coupled to the output terminal 50. The diode D1 prevents the battery 22 from discharging through the solar cell 24 when the voltage across the battery 22 exceeds the voltage output of the solar cell 24. A heat sink 60 is disposed adjacent the Schottky high-power diode D1 to dissipate heat generated by current flowing through the diode D1.

A resistor network 64 is coupled across the output terminals 50, 52 and includes, in the present specific example, a 10-kilohm variable resistor RV coupled in series between a 24-kilohm resistor R1 and a 100-kilohm resistor R2. The variable resistor RV has a wiper terminal 66 which provides a voltage signal $V_T$ proportional to the voltage across the output terminals 50, 52, and, in turn, to the terminal voltage across the battery terminals 40, 42. The constant of proportionality, and thus the voltage signal $V_T$ at the wiper terminal 66, can be adjusted to any desired value by properly setting the resistance of the variable resistor RV, and further adjustments may be made by selecting other suitable values for the resistors R1 and R2, if necessary.

A 10-μF smoothing capacitor C1 is coupled between the wiper terminal 66 of the variable resistor RV and the output terminal 50 of the regulator 44 to minimize voltage transients in the voltage $V_T$. The 10-μF capacitor C1 is selected to provide a time constant that will maintain the voltage signal $V_T$ at the desired value thereof (about 7.2 volts). This value of $V_T$ is chosen so that the regulator 44 will regulate the battery voltage of a lead-acid battery 22 to a desired level of about 14.2 volts. It should be noted that this voltage value is specific to lead-acid batteries.

A Zener diode ZD having a breakdown voltage of about 7.2 volts and a 2-kilohm resistor R3 are coupled in series between the output terminal 50 and the input terminal 48 to provide a reference voltage signal $V_R$ for comparison with the voltage signal $V_T$. The cathode of the Zener diode ZD is coupled to the output terminal 50 (and thus to the cathode of the diode D1), and the anode of the Zener diode ZD is coupled to the resistor R3. A 10-μF capacitor C2 is coupled in parallel with the Zener diode ZD in order to minimize voltage transients on the reference voltage signal $V_R$.

A pair of operational amplifiers 68, 70, connected as voltage comparator circuits, are provided to compare the terminal voltage signal $V_T$ to the reference voltage signal $V_R$ and to turn the transistor Q1 on and off to respectively establish and break an electrical connection between the input terminals 46, 48 and the output terminals 50, 52 of the regulator 44. The inverting input terminal of the operational amplifier 68 is coupled through a 68-kilohm input resistor R4 to the anode of the Zener diode ZD, and the non-inverting input terminal of the operational amplifier 68 is coupled through a 68-kilohm input resistor R5 to the wiper terminal 66 of the variable resistor RV. In addition, a 270-kilohm feedback resistor R6 is coupled from the non-inverting input of the operational amplifier 68 to the cathode of a diode D2, the anode of which, in turn, is coupled to the output of the operational amplifier 68. A 10-megohm feedback resistor R7 is coupled from the non-inverting input of the operational amplifier 68 to the anode of a diode D3, the cathode of which, in turn, is coupled to the output of the operational amplifier 68.

In this configuration, the operational amplifier 68 compares the terminal voltage signal $V_T$ to the reference voltage signal $V_R$ and produces a first op-amp output signal from when the voltage across the output terminals 50, 52 is at a first low level of approximately 13 volts until the voltage across the output terminals 50, 52 is at a first high level of approximately 15 volts. This first op-amp output signal is coupled through a diode D4 and a 470-ohm resistor R8 to the gate 72 of the transistor Q1. When the voltage across the output terminals 50, 52 is increasing between approximately 13 volts and approximately 15 volts, the operational amplifier 68 will cause the transistor Q1 to turn on, establishing an electrical connection between the input terminal 48 and the output terminal 52 of the regulator 44 and permitting the battery 22 to be charged by the solar cell 24. The operational amplifier 68 has a relatively wide hysteresis band (about 2 volts) and sets the maximum voltage to which the battery 22 will be exposed.

The inverting input terminal of the operational amplifier 70 is coupled through a 10-kilohm input resistor R9 to the anode of the Zener diode ZD, and the non-inverting input terminal of the operational amplifier 70 is coupled through a 10-kilohm input resistor R10 to the wiper terminal 66 of the variable resistor RV. In addition, a 10-megohm feedback resistor R11 is coupled from the non-inverting input terminal of the operational amplifier 70 to the output of the operational amplifier 70.

In this configuration, the operational amplifier 70 compares the terminal voltage signal $V_T$ to the reference voltage signal $V_R$ and produces a second op-amp output signal from when the voltage across the output terminals 50, 52 is at a second low level of approximately 14.1 volts until the voltage across the output terminals 50, 52 is at a second high level of approximately 14.3 volts. This second op-amp output signal is coupled through a diode D5 and the 470-ohm resistor R8 to the gate 72 of the transistor Q1. Thus, when the voltage across the output terminals 50, 52 is increasing between approximately 14.1 volts and approximately 14.3 volts, the operational amplifier 70 will cause the transistor Q1 to turn on, establishing an electrical connection between the input terminal 48 and the output terminal 52 of the regulator 44.

The operational amplifier 70 has a relatively narrower hysteresis band than the operational amplifier 68 (about 200 millivolts). The center of the hysteresis band of the operational amplifier 70 (i.e., the desired voltage level to which the battery 22 is to be regulated) is selected by setting the resistance of the variable resistor RV to approximately 5 kilohms to attain the desired voltage $V_T$ as described above. The upper and lower voltage limit values of the hysteresis band of the operational amplifier 70 are determined by setting the resistances of the feedback resistor R11 and the resistor R10 to values that will ensure that the battery voltage is regulated to a voltage within an acceptable range of the desired value (in this case, to between 14.1 and 14.3 volts).

If desired, a light-emitting diode D6 and a 10-kilohm current-limiting resistor R12 may be coupled in series between the gate 72 of the transistor Q1 and the input terminal 48 of the regulator 44, which is typically grounded as shown in FIG. 3. The optional light-emitting diode D6 is illuminated whenever the transistor Q1 is turned on by either or both of the operational amplifiers 68 and 70 to indicate that the battery 22 is being charged. The resistor R12 limits the current flowing through the light-emitting diode D6. Also, when both operational amplifiers 68 and 70 are off, the resistor R12 reduces the gate voltage of the transistor Q1 to ensure that it turns off.

In order to protect the regulator 44 from damage in the event that it is connected to the solar cell 24 with reversed or incorrect polarity, a current-shunting diode D7 may be coupled across the input terminals 46, 48. Also, to protect the regulator 44 from the adverse effects of transient voltage signals, a capacitor C3 and a metal-oxide varistor MOV1 are coupled in parallel across the output terminals 50, 52.

A diode D8 is coupled between the anode of the diode D1 (i.e., the input terminal 46 of the regulator 44) to the power terminals of the operational amplifiers 68 and 70. The diode D8 protects the operational amplifiers 68, 70 in the event that the regulator 44 is connected improperly.

The regulator 44 may be either incorporated directly into a solar cell 24 so that the solar cell 24 provides a regulated current output, or provided as a separate unit that may be coupled to a solar cell 24 as described above.

The operation of the regulator 44 is now described with reference to FIGS. 3–5.

Figure 4:
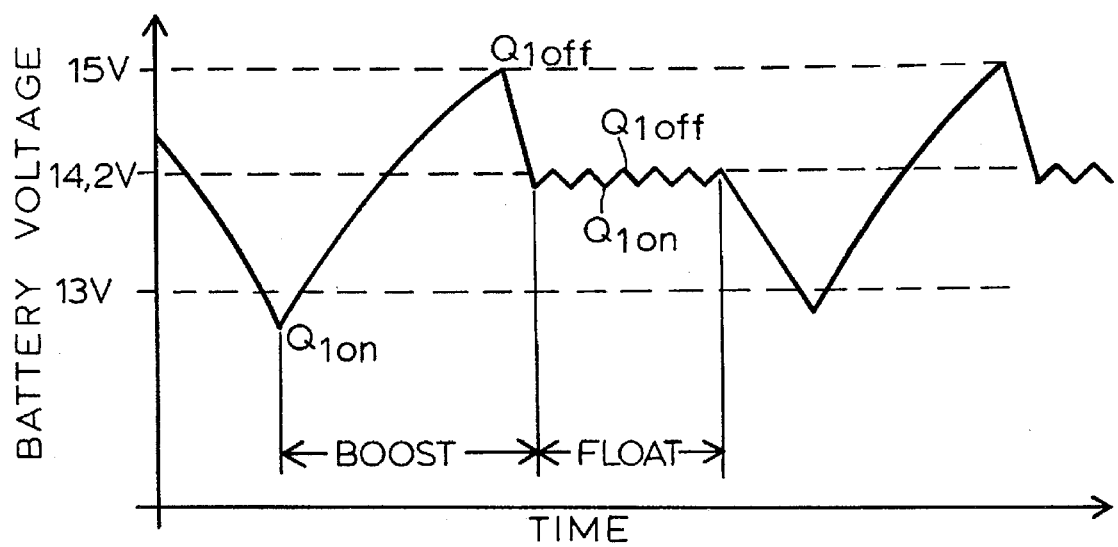
FIG. 4 is a waveform illustrating a steady-state charging characteristic of a battery charged through the regulator of FIGS. 2 and 3.

FIG. 4 illustrates the steady-state voltage characteristic for charging a lead-acid battery 22 from a solar cell 24 using a regulator 44 according to the present invention. When the battery 22 is charged, the battery voltage is regulated to about 14.2 volts (more specifically, to between 14.1 and 14.3 volts). When a load is connected across the battery terminals 40, 42, the battery 22 begins to discharge, and the voltage across the battery terminals 40, 42 (the "battery voltage") drops. When the battery voltage drops below about 14.1 volts, indicating that the battery 22 is in need of charging, the transistor Q1 is turned on by the operational amplifier 70, and the battery 22 begins to be charged from the solar cell 24. However, while the load remains connected across the battery terminals 40, 42, the battery 22 continues to discharge and the battery voltage continues to drop because the battery 22 discharges through the load faster than it can be recharged by the solar cell 24.

In practice, the load is automatically disconnected when the battery voltage drops to about 11.5 volts and, because the transistor Q1 is on (due to both operational amplifiers 68, 70 being on), the battery 22 is charged from the solar cell 24 through the regulator 44. When the battery voltage rises above 14.3 volts, the operational amplifier 70 turns off, but the operational amplifier 68, and thus the transistor Q1, remains on to allow the battery 22 to be momentarily overcharged or boosted until the battery voltage reaches about 15 volts. This momentary overcharging is an important feature of this invention because it agitates or electrically stirs the electrolytic fluid in the lead-acid battery 22 to ensure that the electrolytic fluid remains homogeneously mixed. The operational amplifier 68 turns off the transistor Q1 when the voltage reaches about 15 volts to prevent evaporation of the electrolytic fluid, thus prolonging the life of the battery 22.

When the transistor Q1 turns off at the 15-volt level, the battery voltage decreases to about 14.1 volts. When the battery voltage reaches about 14.1 volts, the operational amplifier 70 turns the transistor Q1 on once again, charges the battery to a voltage of about 14.3 volts, and turns off. This process is continually repeated to maintain the battery voltage between about 14.1 and about 14.3 volts until the battery 22 is substantially discharged once again through a load (e.g., through an inverter and an AC electric motor).

As the battery 22 discharges through the load (not shown), the battery voltage begins to drop once again, and the above-described battery-charging process is repeated.

FIG. 5 illustrates the voltage characteristic obtained the first time a new battery 22 is charged from a solar cell 24 using the regulator 44. This characteristic is similar to that described above in connection with FIG. 4, except that the first time a battery 22 is charged, the battery voltage remains at approximately 13 volts for a substantial period of time (e.g., nearly twenty-five minutes as shown in FIG. 5). The battery 22 then charges rapidly to approximately 15 volts before the transistor Q1 is turned off. Thereafter, the battery 22 is alternately charged and discharged as described above.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. A circuit for regulating charging of a rechargeable storage device having a pair of device terminals by means of a photovoltaic cell having a pair of cell terminals, the circuit comprising:

a pair of input terminals for coupling to the cell terminals;

a pair of output terminals for coupling to the device terminals;

switching means for selectively establishing and breaking an electrical connection between said input terminals and said output terminals;

means coupled to the device terminals for providing a signal proportional to a terminal voltage across the output terminals;

first causing means responsive to the signal and a first voltage limit for causing the switching means to establish an electrical connection thereby permitting a current of a predetermined magnitude to flow between the input terminals and the output terminals when the signal is equal to a first predetermined proportion of the first voltage limit; and second causing means responsive to the signal and a second voltage limit for causing the switching means to establish an electrical connection between the input terminals and the output terminals when the signal is equal to a second predetermined proportion of the second voltage limit, thereby permitting the current of a predetermined magnitude to flow between the input terminals and the output terminals.

2. The circuit of claim 1, wherein at least one of the first and second causing means causes the switching means to establish the electrical connection when the signal is equal to a respective one of the first and second voltage limits.

3. The circuit of claim 1, wherein the first causing means is further responsive to a third voltage limit and causes the switching means to break the electrical connection between the input terminals and the output terminals when the signal is equal to a third predetermined proportion of the third voltage limit.

4. The circuit of claim 3, wherein the second causing means is further responsive to a fourth voltage limit and causes the switching means to break the electrical connection between the input terminals and the output terminals when the signal is equal to a fourth predetermined proportion of the fourth voltage limit.

5. The circuit of claim 4, wherein at least one of the first and second causing means causes the switching means to break the electrical connection when the signal is equal to a respective one of the third and fourth voltage limits.

6. The circuit of claim 4, wherein the second and fourth voltage limits are between the first and third voltage limits.

7. The circuit of claim 4, wherein the third voltage limit is substantially higher than the second and fourth voltage limits.

8. The circuit of claim 1, wherein the switching means includes a transistor coupled between one of the input terminals and one of the output terminals.

9. The circuit of claim 1, wherein the providing means includes a variable resistor coupled across the output terminals, wherein the variable resistor has a brush terminal that provides a signal proportional to the terminal voltage.

10. The circuit of claim 1, wherein the first causing means includes an operational amplifier responsive to the signal and a reference voltage for establishing an electrical connection between the input terminals and the output terminals when the signal is equal to a predetermined proportion of the reference voltage.

11. The circuit of claim 10, wherein the second causing means includes an operational amplifier responsive to the signal and the reference voltage for establishing an electrical connection between the input terminals and the output terminals when the signal is equal to a predetermined proportion of the reference voltage.

12. A charging system comprising, in combination:
a photovoltaic cell having a pair of cell terminals;
a rechargeable storage device having a pair of device terminals; and
a circuit for regulating charging of the rechargeable storage device by means of the photovoltaic cell, the circuit including:
a pair of input terminals for coupling to the cell terminals;
a pair of output terminals for coupling to the device terminals;
switching means for selectively establishing and breaking an electrical connection between said input terminals and said output terminals;
means coupled to the device terminals for providing a signal proportional to a terminal voltage across the output terminals;
first causing means responsive to the signal and a first voltage limit for causing the switching means to establish an electrical connection thereby permitting a current of a predetermined magnitude to flow between the input terminals and the output terminals when the signal is equal to a first predetermined proportion of the first voltage limit; and
second causing means responsive to the signal and a second voltage limit for causing the switching means to establish an electrical connection between the input terminals and the output terminals when the signal is equal to a second predetermined proportion of the second voltage limit, thereby permitting the current of a predetermined magnitude to flow between the input terminals and the output terminals.

13. The system of claim 12, wherein the first causing means is further responsive to a third voltage limit and causes the switching means to break the electrical connection between the input terminals and the output terminals when the signal is equal to a predetermined proportion of the third voltage limit.

14. The system of claim 13, wherein the rechargeable storage device is a lead-acid battery having an electrolytic solution therein, and wherein the third voltage limit is sufficiently large that the electrolytic solution is at least momentarily agitated by the regulated current before the first causing means causes the switching means to break the electrical connection between the input terminals and the output terminals.

15. The system of claim 14, wherein at least one of the first, second, third, and fourth causing means affects the electrical connection when the signal is equal to a respective one of the first, second, third, and fourth voltage limits.

16. A circuit for regulating charging of a rechargeable storage device having a pair of device terminals by a photovoltaic cell having a pair of cell terminals, the circuit comprising:
a pair of input terminals for coupling to the cell terminals;
a pair of output terminals for coupling to the device terminals;
a transistor for selectively establishing and breaking an electrical connection between the input terminals and the output terminals;
means coupled to the device terminals for providing a signal proportional to a terminal voltage across the output terminals;
a first operational amplifier responsive to the signal and to first and second voltage limits for causing the transistor to establish an electrical connection between the input terminals and the output terminals when the signal is equal to a predetermined proportion of the first voltage limit and for causing the transistor to break the electrical connection between the input terminals and the output terminals when the signal is equal to a predetermined proportion of the second voltage limit; and
a second operational amplifier responsive to the signal and to third and fourth voltage limits for causing the transistor to establish an electrical connection between the input terminals and the output terminals when the signal is equal to a predetermined proportion of the third voltage limit and for causing the transistor to break the electrical connection between the input terminals and the output terminals when the signal is equal a predetermined proportion of the fourth voltage limit;
wherein a current of a predetermined magnitude is permitted to flow between the input terminals and the output terminals when the transistor is caused to establish an electrical connection by either of the first and second operational amplifiers; and
wherein the current is not permitted to flow between the input terminals and the output terminals when the transistor breaks the electrical connection.

17. The circuit of claim 16, wherein at least one of the first, second, third, and fourth causing means affects the electrical connection when the signal is equal to a respective one of the first, second, third, and fourth voltage limits.

18. The circuit of claim 16, wherein the third and fourth voltage limits are between the first and second voltage limits.

19. The circuit of claim 18, wherein the first voltage limit is substantially equal to thirteen volts.

20. The circuit of claim 18, wherein the second voltage limit is substantially equal to fifteen volts.

21. The circuit of claim 18, wherein the third voltage limit is substantially equal to 14.1 volts.

22. The circuit of claim 18, wherein the fourth voltage limit is substantially equal to 14.3 volts.

23. A charging system comprising, in combination:

a photovoltaic cell having a pair of cell terminals;

a rechargeable storage device having a pair of device terminals; and a circuit for regulating charging of the rechargeable storage device by a photovoltaic cell, the circuit comprising:

a pair of input terminals for coupling to the cell terminals;

a pair of output terminals for coupling to the device terminals;

a transistor for selectively establishing and breaking an electrical connection between the input terminals and the output terminals;

means coupled to the device terminals for providing a signal proportional to a terminal voltage across the output terminals;

a first operational amplifier responsive to the signal and to first and second voltage limits for causing the transistor to establish an electrical connection between the input terminals and the output terminals when the signal is equal to a predetermined proportion of the first voltage limit and for causing the transistor to break the electrical connection between the input terminals and the output terminals when the signal is equal to a predetermined proportion of the second voltage limit; and a second operational amplifier responsive to the signal and to third and fourth voltage limits between the first and second voltage limits for causing the transistor to establish an electrical connection between the input terminals and the output terminals when the signal is equal to a predetermined proportion of the third voltage limit and for causing the transistor to break the electrical connection between the input terminals and the output terminals when the signal is equal a predetermined proportion of the fourth voltage limit;

wherein a current of a predetermined magnitude is permitted to flow between the input terminals and the output terminals when the transistor is caused to establish an electrical connection by either of the first and second operational amplifiers; and wherein the current is not permitted to flow between the input terminals and the output terminals when the transistor breaks the electrical connection.

24. The system of claim 23, wherein the rechargeable storage device is a lead-acid battery having an electrolytic solution therein, and wherein the second voltage limit is sufficiently large that the electrolytic solution is at least momentarily agitated by the regulated current before the first operational amplifier causes the transistor to break the electrical connection between the input terminals and the output terminals.

25. A regulator circuit for connection between solar cell terminals and rechargeable battery terminals, said regulator circuit comprising:

first reference means for providing a first reference voltage;

second reference means for connection to the battery terminals and for providing a second reference voltage;

a single controllable switch means having open and closed conditions for connecting the solar cell terminals to the battery terminals in response to a control signal;

first control means responsive to said first and said second reference voltages for providing said control signal to close the single controllable switch from when said second reference voltage is at a first low level until said second reference voltage is at a first high level; and second control means responsive to said first and second reference voltages for providing said control signal to close the single controllable switch from when said second reference voltage is at a second low level until said second reference voltage is at a second high level;

wherein said second low level and said second high level are between said first low level and said first high level.

26. The regulator circuit of claim 25, wherein the battery has a rated voltage, and said first high level is substantially above said rated voltage.

27. The regulator circuit of claim 26, wherein said second low level and said second high level are below and above said rated voltage, respectively, but are substantially closer to the rated voltage than are the first low level and the first high level, respectively.

* * * * *